Patented Feb. 11, 1936

2,030,222

UNITED STATES PATENT OFFICE 2,030,222

STABLE AQUEOUS DISPERSION

Edwin B. Newton, Akron, Ohio, assignor to The B. F. Goodrich Company, New York, N. Y., a corporation of New York No Drawing. Application December 21, 1932, Serial No. 648,320

20 Claims. (Cl. 134—17)

This invention relates to the preparation of stable aqueous dispersions of water-insoluble materials, particularly dispersions of rubber and of compounding ingredients used therewith.

Natural rubber dispersions such as latex normally are more or less unstable and tend to coagulate under the influence of heat, mechanical friction, or upon the addition of certain compounding ingredients. In employing such dispersions in manufacturing processes, particularly when it is desired to add vulcanizing agents, fillers, pigments etc., as is usually the case, it is necessary to incorporate in the dispersion a material capable of rendering it more stable or less sensitive to coagulating influences.

Likewise in the preparation of artificial dispersions of rubber and of the many materials which are normally admixed with natural and artificial rubber dispersions in commercial practice, it is necessary to employ in the mixture undergoing dispersion a material capable of aiding or promoting the dispersing action and of stabilizing the dispersion when prepared.

These added materials have been variously termed "dispersing agents", "emulsifying agents" etc. if added to the mixture before or during the actual dispersing of the insoluble material, or "stabilizing agents", "anti-coagulants", etc. if added to a previously prepared dispersion to render it more stable.

However, regardless of when the material is introduced into the dispersion and of what name may be applied to it, the function in each case is basically the same. This function is believed to be in the nature of the formation of a protective film of the added material surrounding the dispersed particles which film serves to promote wetting of the particles by the aqueous dispersion medium, and to aid in inhibiting coalescence of the dispersed particles, or otherwise to aid in the dispersion of the particles and the stabilization of the dispersion when prepared. Consequently, the term "protective agent" will be employed hereafter to include all such so-called dispersing and/or stabilizing agents capable of aiding in the preparation of artificial dispersions and of increasing the stability of natural or artificially prepared dispersions.

Numerous materials have been proposed for use as protective agents in latex and artificial dispersions of all kinds, but such prior agents have not proved entirely satisfactory in all cases.

It is therefore the object of the present invention to provide a superior protective agent for use in natural and artificial aqueous dispersions of water-insoluble materials, particularly of rubber and of the numerous compounding ingredients commonly mixed therewith. It is a further object of this invention to prepare stable aqueous dispersions of rubber, either compounded or uncompounded, which shall be more satisfactory than those containing prior protective agents. Other objects will appear from the following description of the invention.

I have found that salts formed by the reaction of shellac with strong salt-forming nitrogenous bases are excellent protective agents and that the incorporation of small amounts, ranging usually from 0.1 to 2.0%, of these salts in mixtures to be dispersed or in prepared dispersions of rubber and/or compounding ingredients produces a superior stable product. The salts formed by the reaction of shellac with the volatile strong nitrogenous bases such as ammonia, and particularly the volatile aliphatic amines such as methylamine, ethylamine, dimethylamine, diethylamine, trimethylamine, and triethylamine are especially effective protective agents. The shellac salts may be used alone or in conjunction with other well known protective agents such as casein, gelatine, soaps, alkalies, etc.

Shellac being an acidic substance, the salts may be prepared readily by simply dissolving shellac in a suitable solvent such as an alcohol, and stirring into the solution a quantity of the base necessary to neutralize the acidic shellac. The resulting shellacate is soluble in water as well as in the common organic solvents, and the prepared salt solution may be added directly to an aqueous dispersion or may be admixed with material to be dispersed in water.

In a specific example of the present invention, the shellac salt is prepared by dissolving 82.65 parts by weight of orange shellac in an equal weight of denatured alcohol. Then 34.7 parts of a 50% solution of diethylamine is stirred into the shellac solution and the two allowed to react. The resulting solution contains about 50% of the diethylamine salt of shellac.

The shellac salts are particularly useful in preparing dispersions of powdery materials like carbon black which are difficult to wet. In preparing such a dispersion, 3 parts by weight of casein are swelled in a small amount of water and 1 part of concentrated (28%) ammonia solution is added to dissolve the casein. The mixture is diluted with sufficient water to make a total of 394.5 parts of water added as such and 13.5 parts of a 50% solution of the diethylamine salt of shellac are then added. 100 parts of carbon black are then stirred into the liquid and the mixture is passed through a colloid mill until the black is dispersed.

In some cases it is desirable to employ the shellac salts as stabilizers in compounded latices. For example I may add 0.25 parts by weight of a shellac salt to a mixture containing 100 parts of rubber added as 60% latex, 10 parts pigment, 2 parts sulphur, 0.35 parts accelerator, 0.75 parts age-resister and 2.0 parts of a coloring pigment. Such dispersions containing the shellac salts of the present invention are quite stable and very satisfactory for use in manufacturing processes.

As has been indicated hereinabove, the shellac salts are useful as protective agents in all natural and artificial dispersions of rubber and like natural or synthetic gums, as well as in artificial dispersions of the many rubber compounding ingredients including vulcanizing agents, accelerators, age-resisters, fillers, reenforcing agents, pigments, softeners and like materials, which are to be incorporated into aqueous rubber dispersions, or used in other manners. Obviously, the novel protective agents of this invention may also be widely used in preparing and stabilizing dispersions of many materials in addition to those specifically mentioned, and it is not intended to limit the invention hereof except as may be required by the prior art and as indicated in the appended claims.

I claim:

1. The method of stabilizing an aqueous dispersion comprising finely divided solid particles of water-insoluble material which comprises adding to the dispersion a quantity of a salt formed by the reaction of shellac with a volatile strong nitrogenous base.

2. The method of stabilizing an aqueous dispersion of water-insoluble material which comprises mixing into the dispersion a quantity of a salt formed by the reaction of shellac with a volatile aliphatic amine 3. The method of stabilizing an aqueous dispersion of water-insoluble material which comprises mixing into the dispersion a small quantity of the diethylamine salt of shellac.

4. The method of preparing a stable aqueous dispersion which comprises subjecting to a dispersing process a mixture containing a solid material to be dispersed, an aqueous dispersion medium and a salt formed by the reaction of shellac with a volatile strong nitrogenous base.

5. The method of dispersing water-insoluble material in an aqueous medium which comprises subjecting to a dispersing process a mixture containing the material to be dispersed, water, and a salt formed by the reaction of shellac with a volatile aliphatic amine.

6. The method which comprises subjecting to a dispersing process a mixture containing water-insoluble material to be dispersed, water as a dispersion medium, and a quantity of the diethylamine salt of shellac.

7. A stabilized aqueous dispersion of water-insoluble finely divided solid material containing a salt formed by the reaction of shellac with a volatile strong nitrogenous base.

8. A stabilized aqueous dispersion of water-insoluble material containing a quantity of salt formed by the reaction of shellac with a volatile aliphatic amine.

9. A stable aqueous dispersion of water-insoluble material containing a quantity of the diethylamine salt of shellac.

10. A stabilized aqueous rubber dispersion containing a salt formed by the reaction of shellac with a volatile strong nitrogenous base.

11. A stable aqueous rubber dispersion containing a quantity of a salt formed by the reaction of shellac with a volatile aliphatic amine.

12. An aqueous rubber dispersion stabilized with a small quantity of the diethylamine salt of shellac.

13. A stabilized aqueous dispersion containing rubber, admixed compounding ingredients, and a salt formed by the reaction of shellac with a volatile strong nitrogenous base.

14. A stable aqueous dispersion containing rubber, admixed compounding ingredigents, and a salt formed by the reaction of shellac with a volatile aliphatic amine.

15. A stable aqueous dispersion containing rubber, admixed compounding ingredients, and a small quantity of the diethylamine salt of shellac.

16. A stable aqueous dispersion of water-insoluble finely divided solid material containing a salt formed by the reaction of shellac with a volatile strong nitrogenous base selected from the class consisting of ammonia and volatile aliphatic amines.

17. A stable aqueous dispersion containing rubber and a salt formed by the reaction of shellac with a volatile strong nitgrogenous base selected from the class consisting of ammonia and volatile aliphatic amines.

18. A stable aqueous dispersion containing rubber, admixed compounding ingredients, and a salt formed by the reaction of shellac with a volatile strong nitrogenous base selected from the class consisting of ammonia and volatile aliphatic amines.

19. The method of stabilizing an aqueous dispersion comprising finely divided solid particles of water-insoluble material which comprises adding to the dispersion a quantity of a salt formed by the reaction of shellac with a volatile strong nitrogenous base selected from the class consisting of ammonia and volatile aliphatic amines.

20. The method of dispersing water-insoluble solid material which comprises subjecting to a dispersing process a mixture containing the material to be dispersed, water, and a salt formed by the reaction of shellac with a volatile strong nitrogenous base selected from the class consisting of ammonia and volatile aliphatic amines.

EDWIN B. NEWTON.